United States Patent
Jansson et al.

(10) Patent No.: US 12,084,563 B2
(45) Date of Patent: Sep. 10, 2024

(54) REFINED CELLULOSE FIBER COMPOSITION

(71) Applicant: Stora Enso OYJ, Helsinki (FI)

(72) Inventors: Ulla Jansson, Karlstad (SE); Anders Moberg, Hammarö (SE); Kaj Backfolk, Villmanstrand (FI)

(73) Assignee: Stora Enso OYJ, Helsinki (FI)

( * ) Notice: Subject to any disclaimer, the term of this patent is extended or adjusted under 35 U.S.C. 154(b) by 117 days.

(21) Appl. No.: 17/597,317

(22) PCT Filed: Jun. 30, 2020

(86) PCT No.: PCT/IB2020/056160
§ 371 (c)(1),
(2) Date: Jan. 3, 2022

(87) PCT Pub. No.: WO2021/001751
PCT Pub. Date: Jan. 7, 2021

(65) Prior Publication Data
US 2022/0363871 A1  Nov. 17, 2022

(30) Foreign Application Priority Data
Jul. 4, 2019 (SE) .................... 1950843-1

(51) Int. Cl.
| | | |
|---|---|---|
| *C08L 1/02* | (2006.01) | |
| *D21C 9/00* | (2006.01) | |
| *D21H 11/02* | (2006.01) | |
| *D21H 11/18* | (2006.01) | |
| *D21H 21/18* | (2006.01) | |
| *D21H 21/52* | (2006.01) | |
| *D21H 27/30* | (2006.01) | |

(52) U.S. Cl.
CPC ............ *C08L 1/02* (2013.01); *D21C 9/007* (2013.01); *D21H 11/02* (2013.01); *D21H 11/18* (2013.01); *D21H 21/18* (2013.01); *D21H 21/52* (2013.01); *D21H 27/30* (2013.01)

(58) Field of Classification Search
CPC ........... C08L 1/02; D21C 9/007; D21H 11/02; D21H 11/18; D21H 21/18; D21H 21/52; D21H 27/30
See application file for complete search history.

(56) References Cited

U.S. PATENT DOCUMENTS

| | | | |
|---|---|---|---|
| 10,273,634 B2 | 4/2019 | Hietaniemi et al. | |
| 10,704,165 B2 | 7/2020 | Pande et al. | |
| 2003/0051837 A1 | 3/2003 | Silenius | |
| 2004/0231811 A1 | 11/2004 | Engstrand et al. | |
| 2009/0020248 A1 * | 1/2009 | Sumnicht | D21H 13/08 162/141 |
| 2010/0285962 A1 * | 11/2010 | Hoffmann | A01G 24/22 504/142 |
| 2011/0265965 A1 | 11/2011 | Sumnicht et al. | |
| 2013/0000856 A1 | 1/2013 | Kajanto et al. | |
| 2013/0303749 A1 | 11/2013 | Vehniaeinen et al. | |
| 2014/0057105 A1 | 2/2014 | Pande et al. | |
| 2017/0073893 A1 | 3/2017 | Bilodeau et al. | |
| 2017/0226009 A1 | 8/2017 | Marcoccia et al. | |
| 2018/0266054 A1 | 9/2018 | Henaff et al. | |
| 2019/0040582 A1 | 2/2019 | Heiskanen et al. | |

FOREIGN PATENT DOCUMENTS

| | | | |
|---|---|---|---|
| CN | 102812182 A | 12/2012 | |
| CN | 103492634 A | 4/2014 | |
| CN | 106574444 A | 4/2017 | |
| CN | 108130781 A | 6/2018 | |
| CN | 109072550 A | 12/2018 | |
| JP | H11269796 A | 10/1999 | |
| JP | 2013545904 A | 12/2013 | |
| JP | 2015526608 A | 9/2015 | |
| WO | 2007091942 A1 | 8/2007 | |
| WO | 2011157516 A1 | 12/2011 | |
| WO | 2012072874 A1 | 6/2012 | |
| WO | 2018011669 A1 | 1/2018 | |
| WO | WO-2018094493 A1 * | 5/2018 | ............ D21C 3/26 |
| WO | 2018211441 A1 | 11/2018 | |

OTHER PUBLICATIONS

Nanko, The World of Market Pulp, 2005, WOMP LLC, p. 220 (Year: 2005).*
Chae, Effect of Cellulose Pulp Type on the Mercerizing Behavior and Physical Properties of Lyocell Fibers, Textile Research Journal, vol. 73 Issue 6, p. 542-544 (Year: 2003).*
https://aft-global.com/en/resources/pulp-freeness-conversion-chart (Year: 2018).*
https://new.abb.com/pulp-paper/abb-in-pulp-and-paper/articles/how-to-measure-crill (Year: 2022).*
International Search report from corresponding PCT application No. PCT/IB2020/056160 mailed Sep. 15, 2020.

* cited by examiner

*Primary Examiner* — Jacob T Minskey
*Assistant Examiner* — Stephen M Russell
(74) *Attorney, Agent, or Firm* — Greer, Burns & Crain, Ltd.

(57) ABSTRACT

The present invention relates to a refined cellulose fiber composition useful as a strength enhancing agent for paper and paperboard, wherein the refined cellulose fiber composition has a Schopper-Riegler (SR) number in the range of 80-98 as determined by standard ISO 5267-1, and wherein the refined cellulose fiber composition has a content of fibers having a length >0.2 mm of at least 12 million fibers per gram based on dry weight. The invention further relates to a method for preparing the refined cellulose fiber composition and to pulp paper and paperboard comprising the refined cellulose fiber composition.

7 Claims, No Drawings

REFINED CELLULOSE FIBER COMPOSITION

This application is a U.S. National Phase under 35 U.S.C. § 371 of International Application No. PCT/IB2020/056160, filed Jun. 30, 2020, which claims priority under 35 U.S.C. §§ 119 and 365 to Swedish Application No. 1950843-1 filed Jul. 4, 2019.

TECHNICAL FIELD

The present disclosure relates to strength enhancement agents for improving paper or paperboard strength properties, especially for improving Z-strength and/or tensile strength. The present disclosure further relates to the manufacture of such strength enhancement agents and to paper or paperboard comprising such strength enhancement agents.

BACKGROUND

Paperboard comprises a plurality of layers, also known as plies, of pulp and optional additives. The layers are selected and arranged to achieve the desired properties of the paperboard as such. An essential property of the paperboard is the bending stiffness. The bending stiffness in paperboard is usually built up by having outer plies with high tensile stiffness and one or several bulky plies in between, so that the outer plies are placed at a desired distance from each other. The bulky ply/plies is/are often a middle layer/middle layers.

The middle layer in paperboard may comprise a mechanical pulp, such as thermomechanical pulp (TMP) or chemi-thermomechanical pulp (CTMP). TMP and CTMP generally have a high bulk, thereby enabling constructing paperboard with the desired high stiffness at low grammage, compared to for example chemical pulps.

In the CTMP process, wood chips are impregnated with a lignin softening chemical prior to pressurized refining. This results in softening of lignin and the fiber rupture during refining will therefore be concentrated to the lignin rich middle lamella. This results in stiff fibers and a lower amount of fines and shives at a certain energy input compared to TMP. A high concentration of long fibers is important for all products where high bulk is desired. Therefore, CTMP is more advantageous than TMP in paperboard.

The strength of paper is measured in three dimensions: the grain direction, also known as the X-direction; the cross-grain direction, also known as Y-direction; and the direction perpendicular to the paper surface plane, also known as the Z-direction. The force needed to delaminate a sample of a paper is recorded as its internal bond strength, or Z-directional tensile strength. A high Z-strength in the middle layer of paperboard is desired in order to avoid delamination of the middle layer and hence delamination of the paperboard as such. Such a Z-strength must however be achieved without deteriorating the bending stiffness, that is without having to increase the paper web density.

Z-strength and density of a paperboard layer is usually optimized by altering the raw materials, by choosing different operation conditions in stock preparation and on the board machine and by addition of paper chemicals. Like many other strength properties, strength in Z-direction increases with increased density and the effect comes from increase of bonded area between the fibers. The relationship between density and out-of-plane strength may vary depending on pulp type and densification method. Refining increases strength more than wet pressing. The main purpose of refining is to improve the bonding properties of the fibers. Changes that improve fiber-to-fiber bonding are internal and external fibrillation together with fines creation. All three changes result in an increase of the water-holding capacity of the pulp, its density and strength properties such as tensile strength and stiffness, burst and compression strength, and also strength in Z-direction.

While CTMP provides a high bulk, the Z-strength of CTMP is comparatively low.

It is not only paperboard which requires high delamination resistance and bending stiffness. These properties are important in for example printing, in converting and in end-use situations. This means that producing paper and board with high strength in Z-direction is very important for many paper products.

Strength in fiber and paperboard products can be increased by enhancing fiber-fiber contact, such as by surface fibrillation, by using modified fibers, or by using natural or synthetic strength enhancing chemicals such as polysaccharides. One of the recent development trends is to use nanocellulose as a strength enhancing agent. While nanocellulose is very useful as a strength enhancement agent, nanocellulose manufacturing concepts are usually very energy intensive. In order to reduce energy costs, the use of enzymatic pretreatment or chemical pretreatment, such as derivatization, or fiber swelling has been proposed. However, biological, chemical or physico-chemical treatment all requires separate treatment steps or additional process solutions or investments if adopting to pulp mill integration/environment.

Thus, there remains a need for improved solutions to improve the tensile strength and Z-strength strength of paper or paperboard.

DESCRIPTION OF THE INVENTION

A specific object of the invention is to provide a new type of strength enhancement agent that gives paper or paperboard better strength properties, especially a better tensile strength and a better Z-strength.

A further object of the invention is to provide a cellulose based strength enhancement agent, the manufacture of which requires less energy than the manufacture of previous cellulose-based strength enhancement agents.

A further object of the invention is to provide a method for manufacturing a strength enhancement agent for paper or paperboard, which requires less energy than the manufacture of previous cellulose-based strength enhancement agents.

Yet a further object of the invention is to provide a method for manufacturing a strength enhancement agent for paper or paperboard, which can be integrated in a pulp mill without the need for investments in special equipment such as fluidizers or homogenizers.

The above-mentioned objects, as well as other objects as will be realized by the skilled person in the light of the present disclosure, are achieved by the various aspects of the present disclosure.

According to a first aspect illustrated herein, there is provided a refined cellulose fiber composition, wherein the refined cellulose fiber composition has a Schopper-Riegler (SR) number in the range of 80-98 as determined by standard ISO 5267-1, and wherein the refined cellulose fiber composition has a content of fibers having a length >0.2 mm of at least 12 million fibers per gram based on dry weight. The content of fibers having a length >0.2 mm may for example be determined using the L&W Fiber tester Plus instrument (L&W/ABB).

The inventive refined cellulose fiber composition having both a high SR value and a high content of fibers having a length >0.2 mm has been found to be very efficient as a strength enhancing agent when mixed in CTMP sheets, and may prove a sustainable alternative as source reduction agent for paper and paperboard production.

The inventive composition is a refined cellulose fiber composition. The term "cellulose fiber" as used herein refers to natural cellulose fiber, i.e. not regenerated or manufactured fibers, such as lyocell or viscose fibers. Natural cellulose fibers are still recognizable as being from a part of the original plant because they are only processed as much as needed to clean the fibers for use. Refining, or beating, of cellulose pulps refers to mechanical treatment and modification of the cellulose fibers in order to provide them with desired properties.

In some embodiments, the refined cellulose fiber composition has a Schopper-Riegler (SR) number in the range of 85-98, preferably in the range of 90-98, as determined by standard ISO 5267-1. In some embodiments, the refined cellulose fiber composition has a Schopper-Riegler (SR) number in the range of 92-98, preferably in the range of 94-98, as determined by standard ISO 5267-1.

In some embodiments, the refined cellulose fiber composition has a content of fibers having a length >0.2 mm of at least 15 million fibers per gram based on dry weight, preferably at least 17 million fibers per gram based on dry weight, and more preferably at least 20 million fibers per gram based on dry weight.

The refined cellulose fiber composition will typically have a content of fibers having a length >0.2 mm of 50 million fibers per gram or less based on dry weight, preferably 40 million fibers per gram or less based on dry weight, and more preferably 30 million fibers per gram or less based on dry weight.

In some embodiments, the refined cellulose fiber composition has a content of fibers having a length >0.2 mm in the range of 15-50 million fibers per gram based on dry weight, preferably in the range of 17-40 million fibers per gram based on dry weight, and more preferably in the range of 20-30 million fibers per gram based on dry weight. A content of fibers having a length >0.2 mm in the specified ranges has been found to provide an advantageous balance between performance and process economy.

The content of fibers having a length >0.2 mm may be determined using the Fiber Tester Plus instrument.

In some embodiments, the refined cellulose fiber composition has a crill value of at least 1.7, preferably at least 1.8, more preferably at least 1.9. The crill value of the refined cellulose fiber composition will typically be below 2.5. The crill value is determined using the Fiber Tester Plus instrument.

In some embodiments, the refined cellulose fiber composition has a mean fibril area of fibers having a length >0.2 mm of at least 17%, preferably at least 20%, more preferably at least 22%. The refined cellulose fiber composition typically has a mean fibril area of fibers having a length >0.2 mm of less than 50%, such as less than 40% or less than 30%. The term "mean fibril area" as used herein refers to length weighted mean fibril area. The mean fibril area is determined using the Fiber Tester Plus instrument.

The refined cellulose fiber composition according to the invention can be produced from different raw materials, for example softwood pulp or hardwood pulp. The term "cellulose fiber" as used herein refers to natural cellulose fibers, i.e. not regenerated or manufactured fibers, such as lyocell or viscose.

The benefit of reduced energy demand is demonstrated by selecting a fraction of softwood Kraft pulp. Thus, in some embodiments, the cellulose pulp is a softwood pulp.

In some embodiments, the refined cellulose fiber composition is substantially free from lignin, preferably said cellulose pulp has a lignin content below 10% by weight, based on the total dry weight of the pulp.

In some embodiments, the refined cellulose fiber composition is obtained by subjecting a fine fiber fraction obtained by fractionation of a cellulose pulp to refining with a total refining energy in the range of 100-1500 kW/t, preferably in the range of 500-1500 kW/t, more preferably in the range of 750-1250 kW/t.

The present invention further relates to a method for making a refined cellulose fiber composition according to the first aspect with reduced amount of energy.

Thus, according to a second aspect illustrated herein, there is provided a method for manufacturing a refined cellulose fiber composition for use as a strength enhancement agent for paper or paperboard, comprising:
  a) providing a fine fiber fraction obtained by fractionation of a cellulose pulp;
  b) subjecting said fine fiber fraction to refining at a consistency in the range of 0.5-30% by weight to a Schopper-Riegler (SR) number in the range of 80-98, as determined by standard ISO 5267-1, to obtain the refined cellulose fiber composition.

The fine fiber fraction is obtained by size fractionation of a cellulose pulp into a fine fiber fraction and a coarse fiber fraction.

A problem when refining a non-fractionated pulp is that the energy consumption will be high. One option to reduce the energy consumption is to derivatize the pulp or to use enzymes to enhance and facilitate the fibrillation as described e.g. in international patent application WO2007091942A1. However, the use of chemicals and additives have their own limitations, especially in an integrated pulping process. The chemicals increase costs and may also interfere with other chemicals.

The refining process is an energy intensive process that has a significant impact on the properties of many paper products and therefore it is very important to control this process. Today on-line measurements of the drainage resistance of the stock, for example the Schopper-Riegler value, and also sometimes the geometrical dimensions of the fibers are mainly used to control the refining process. One very important variable left out is the potential of fibers to bond to each other. The fibrils that are partially or completely loosened from the fibers are called crill. Crill generated during the refining process significantly improves the bonding between fibers.

Experiments performed by the inventors show that unfractionated pulp can indeed be refined to high SR by increasing the refining energy, which is expected and in line with the prior art. However, the results also show that the content of fibers having a length >0.2 mm and crill value remain on relatively low values. When using 5% by weight of the refined unfractionated pulp in CTMP sheets, both Z-strength and tensile index increase, but the increases are low or moderate.

On the other hand, when the pulp is fractionated into a fine fiber fraction and a coarse fiber fraction, and the refining is performed on a fine fiber fraction, the experiments shows that independently of the softwood mixtures a high SR value can be reached but with a high content of fibers having a length >0.2 mm and a high crill value. This, despite refining being performed at low consistency.

The inventive refined cellulose fiber composition having both a high SR value and a high content of fibers having a length >0.2 mm has been found to be very efficient as a strength enhancing agent when mixed in CTMP sheets, and may prove a sustainable alternative as source reduction agent for paper and paperboard production.

The fine fiber fraction used as the starting material in the inventive method is obtained by size fractionation of a cellulose pulp starting material into a fine fiber fraction and a coarse fiber fraction. Compared to the starting material, the fine fiber fraction has a higher amount of shorter and thinner fibers. The fine fiber fraction may for example be obtained by separating the cellulose pulp starting material in pressure screens to achieve a fraction with shorter and thinner fibers. The dry weight of the fine fiber fraction may for example comprise less than 75% by weight, less than 50% by weight, less than 25% by weight of the total dry weight of the unfractionated cellulose pulp starting material.

The fine fiber fraction typically has a mean fiber length of fibers having a length >0.2 mm below 1.7 mm (as determined according to ISO 16065-2) and a content of fibers having a length >0.2 mm of at least 5 million fibers per gram based on dry weight. The content of fibers having a length >0.2 mm of the fine fiber fraction is typically less than 10 million fibers per gram based on dry weight.

The coarse fiber fraction also obtained from the fractionation, having a reduced amount of fines and fine fibers, may be used for example in the production of tissue.

In some embodiments, the cellulose pulp in step a) is a softwood pulp.

In some embodiments, the cellulose pulp in step a) is a never dried pulp.

In some embodiments, the cellulose pulp in step a) is a non-beaten pulp.

In some embodiments, the cellulose pulp is substantially free from lignin, preferably said cellulose pulp has a lignin content below 10% by weight, based on the total dry weight of the pulp.

In some embodiments, the cellulose pulp has a hemicellulose content in the range of 10-30% by weight, based on the total dry weight of the pulp.

The fine fiber fraction may optionally be treated by oxidation or by addition of an auxiliary strength enhancing agent prior to the refining in step b). In some embodiments, the fine fiber fraction is treated with an oxidant prior to the refining.

In some embodiments, an auxiliary strength enhancing agent is added to the fine fiber fraction prior to the refining.

In some embodiments, the fine fiber fraction in step a) has a Schopper-Riegler (SR) number of less than 70, preferably less than 50, as determined by standard ISO 5267-1.

In some embodiments, the fine fiber fraction in step a) has a content of fibers having a length >0.2 mm in the range of 1-10 million fibers per gram, preferably in the range of 5-10 million fibers per gram.

In some embodiments, the fine fiber fraction in step a) has a mean fiber length in the range of 1-2, preferably in the range of 1-1.7.

In some embodiments, the fine fiber fraction is subjected to refining at a consistency in the range of 1-10% by weight.

In some embodiments, the fine fiber fraction is subjected to refining with a total refining energy in the range of 100-1500 kW/t, preferably in the range of 500-1500 kW/t, more preferably in the range of 750-1250 kW/t.

In some embodiments, the refined cellulose fiber composition in step b) has a Schopper-Riegler (SR) number in the range of 85-98, preferably in the range of 90-98, as determined by standard ISO 5267-1. In some embodiments, the refined cellulose fiber composition has a Schopper-Riegler (SR) number in the range of 92-98, preferably in the range of 94-98, as determined by standard ISO 5267-1.

The refining of the fine fiber fraction results in a refined cellulose fiber composition having a high content of fibers having a length >0.2 mm that are highly fibrillated and have a high crill value.

In some embodiments, the refined cellulose fiber composition has a content of fibers having a length >0.2 mm of at least 12 million fibers per gram based on dry weight, preferably at least 15 million fibers per gram based on dry weight, more preferably at least 17 million fibers per gram based on dry weight, and more preferably at least 20 million fibers per gram based on dry weight.

In some embodiments, the refined cellulose fiber composition has a crill value of at least 1.7, preferably at least 1.8, more preferably at least 1.9. The crill value of the refined cellulose fiber composition will typically be below 2.5. The crill value is determined using the Fiber Tester Plus instrument.

In some embodiments, the refined cellulose fiber composition has a mean fibril area of fibers having a length >0.2 mm of at least 17%, preferably at least 20%, more preferably at least 22%. The refined cellulose fiber composition typically has a mean fibril area of fibers having a length >0.2 mm of less than 50%, such as less than 40% or less than 30%. The term "mean fibril area" as used herein refers to length weighted mean fibril area. The mean fibril area is determined using the Fiber Tester Plus instrument.

Fiber mean length of fibers having a length >0.2 mm, fibril area of fibers having a length >0.2 mm, and crill value were determined using the L&W Fiber Tester Plus (L&W/ABB) instrument (also referred to herein as "Fiber Tester Plus" or "FT+") with definition of fibers as fibrous particles longer than 0.2 mm according to standard ISO 16065-2.

A known sample weight of 0.100 g was used for each sample and the content of fibers having a length >0.2 mm (million fibers per gram) was calculated using the following formula: Million fibers per gram=(No. fibers in sample)/(Sample weight)/1 000 000=(Property ID 3141)/property ID 3136)/1 000 000

The crill measurement method is based on utilizing the ability of particles to absorb and diverge light of different wavelengths depending on their diameter. By leading the pulp suspension through one UV and one IR light source with a detector on the opposite side it is possible to detect if small particles is present in the solution. The more particles the more light is diverged or absorbed. Small particles such as crill will spread and absorb the light from the UV light source whereas the fiber will affect the light from the infrared light source. The crill content is obtained as a quota of UV/IR detected.

The inventive refined cellulose fiber composition may preferably be used as strength enhancing additive in a cellulose pulp (e.g. CTMP) to enhance the strength of paper or paperboard manufactured from the pulp. The refined cellulose fiber composition is typically added to the pulp to be reinforced at a concentration of at least 0.1% by weight, preferably at least 1% by weight. In some embodiments the refined cellulose fiber composition is added to the pulp to be reinforced at a concentration in the range of 1-25%, preferably in the range of 1-15% by weight, more preferably in the range of 1-10% by weight, most preferably in the range of 2-7% by weight, based on dry weight. In some embodiments the refined cellulose fiber composition is added to the pulp to be reinforced at a concentration in the range of 2-5% by weight, based on dry weight.

According to a third aspect illustrated herein, there is provided a cellulose pulp for manufacturing paper or paperboard, comprising at least 0.1% by weight, preferably in the range of 1-25% by weight, more preferably in the range of 1-10% by weight, most preferably in the range of 2-7% by weight, of the refined cellulose fiber composition described herein with reference to the previous aspects, based on dry weight.

In some embodiments, the cellulose pulp is a chemi-thermomechanical pulp (CTMP).

Paper and paperboard comprising the inventive refined cellulose fiber composition exhibits significantly improved tensile strength and a better Z-strength as compared to corresponding paper and paperboard without the inventive refined cellulose fiber composition.

According to a fourth aspect illustrated herein, there is provided a paper or paperboard comprised of one or more plies, wherein at least one ply comprises at least 0.1% by weight, preferably in the range of 1-25% by weight, more preferably in the range of 1-10% by weight, most preferably in the range of 2-7% by weight, of the refined cellulose fiber composition described herein with reference to the previous aspects, based on dry weight.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

According to a fifth aspect illustrated herein, there is provided the use of a refined cellulose fiber composition described herein with reference to the previous aspects for improving the Z-strength and/or tensile strength of a paper or paperboard.

The strength enhancement agent in the third, fourth and fifth aspects may be further defined as set out above with reference to the first and second aspect.

The term "Vo based on dry weight" as used herein (e.g. with reference to pulp compositions or pulp fractions) refers to weight percent based on the total dry weight of the composition.

While the invention has been described with reference to various exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Analysis

Fiber mean length of fibers having a length >0.2 mm, fibril area of fibers having a length >0.2 mm, and crill value were determined using the L&W Fiber Tester Plus (L&W/ABB) instrument (FT+) with definition of fibers as fibrous particles longer than 0.2 mm according to standard ISO 16065-2.

A known sample weight of 0.100 g was used for each sample and the content of fibers having a length >0.2 mm (million fibers per gram) was calculated using the following formula: Million fibers per gram=(No. fibers in sample)/(Sample weight)/1 000 000=(Property ID 3141)/property ID 3136)/1 000 000

Drainage resistance (tap water), was determined according to Schopper-Riegler method ISO 5267-1.

Sheet properties were measured according to the following standards:

Tensile testing ISO 1924-3:2005

Z-strength testing ISO 15754:2009

Starting Materials

Softwood pulp 1 (SW1) is softwood kraft pulp (spruce/pine mixture) with a mean fiber length (>0.2 mm) of 2.1 mm according to ISO 16065-2 and a content of fibers having a length >0.2 mm of 4.2 million fibers per gram based on the FT+.

Softwood pulp 2 (SW2) is softwood kraft pulp (pine) with a mean fiber length (>0.2 mm) of 2.1 mm according to ISO 16065-2 and a content of fibers having a length >0.2 mm of 3.6 million fibers per gram based on the FT+.

Softwood pulp 3 (SW3) is softwood kraft pulp (spruce) with a mean fiber length (>0.2 mm) of 2.6 mm according to ISO 16065-2 and a content of fibers having a length >0.2 mm mm of 3.1 million fibers per gram based on the FT+.

Softwood pulp 4 (SW4) is softwood kraft pulp (spruce/pine mixture) with a mean fiber length (>0.2 mm) of 2.4 mm.

Fractionation

A fine fiber fraction was achieved by separating the pulp in pressure screens (equipped with screen basket with hole size 1.2 mm) with the aim to obtain a fraction with many short fibers. By a two-stage procedure 4-7% of the pulp was separated from the Feed pulp stream. The two-stage procedure decreased the fiber length and increased the number of fibers per gram. In addition to the FT+mean length measurements, mean length was also determined using a Valmet fiber image analyzer FS5 with definition of fibers as fibrous particles longer than 0.2 mm according to standard ISO 16065-2.

| Material | Sample | ISO std 16065 FS5 Mean length (>0.2 mm) | ISO std 16065 FT+ Mean length (>0.2 mm) | FT+ Fibril area (>0.2 mm) | FT+ Crill Quota UV/IR | FT+ Million fibres (>0.2 mm) per gram |
|---|---|---|---|---|---|---|
| SW1 | Feed pulp | 2.00 | 2.10 | 0.9 | 0.98 | 4.2 |
| SW1 | Fine fibre fraction | 1.47 | 1.57 | 1.2 | 1.05 | 6.6 |
| SW2 | Feed pulp | 2.01 | 2.11 | 0.9 | 0.97 | 3.6 |
| SW2 | Fine fibre fraction | 1.46 | 1.49 | 1.5 | 0.99 | 6.6 |
| SW3 | Feed pulp | 2.52 | 2.62 | 1.4 | 0.99 | 3.1 |

-continued

| Material | Sample | ISO std 16065 FS5 Mean length (>0.2 mm) | ISO std 16065 FT+ Mean length (>0.2 mm) | FT+ Fibril area (>0.2 mm) | FT+ Crill Quota UV/IR | FT+ Million fibres (>0.2 mm) per gram |
|---|---|---|---|---|---|---|
| SW3 | Fine fibre fraction | 1.63 | 1.57 | 1.8 | 1.07 | 7.5 |
| SW4 | Feed pulp | 2.35 | | | | |
| SW4 | Fine fibre fraction | 1.58 | 1.48 | 1.7 | 1.06 | 9.6 |

Refining

Refining of the unfractionated and fine fiber fraction samples was done with a Voith Sulzer LR1 refiner with 2 mm disc refiner at ~4% consistency and 100 liter/min flow rate as follows.

Example 1 (Unfractionated)

SW1 pulp was refined with conical refiner fillings with 3 mm bars and cutting angle 60 degrees, at edge load 1.0 Ws/m to a refining energy of 466 kWh/t.

Example 2 (Unfractionated)

SW1 pulp was refined with conical refiner fillings with 3 mm bars and cutting angle 60 degrees, at edge load 1.0 Ws/m to a refining energy of 1032 kWh/t.

Example 3 (Unfractionated)

SW3 pulp was refined with disc refiner fillings with 2 mm bars and cutting angle 40 degrees, at edge load 0.25 Ws/m to a refining energy of 750 kWh/t.

Example 4 (Unfractionated)

SW2 pulp was refined with conical refiner fillings with 3 mm bars and cutting angle 60 degrees, at edge load 1.0 Ws/m to a refining energy of 950 kWh/t.

Example 5-9 Fine Fibre Fractions (Fractionated)

The fine fiber fractions were refined with disc refiner fillings with 2 mm bars and cutting angle 40 degrees, at edge load 0.25 Ws/m to a refining energy 1039-1550 kWh/t.

Sheet Preparation

5% by weight of the refined sample was added to CTMP (Spruce CTMP with Canadian standard freeness of 600 ml CSF) and sheets for strength testing were prepared with a Formette dynamic sheet former with pulp consistency 3 g/liter and 1 minute mixing at 1000 rpm before making the sheets with nozzle 2514, pressure 2.5 bar, rotational speed 1050 rpm, basis weight 100 g/m$^2$, dewatering time 2 minutes, couching with blotter papers, 1st roll pressing 1 bar between felts, replacing blotters and 2nd pressing at 5 bar between felts, replacing blotters and 3rd pressing without felts at 5 bar, drying in bow dryer at 95° C., conditioning at 23° C. 50% RH. For efficient mixing of the pulp furnish, the Formette dynamic sheet former was equipped with a baffled mixing chest similar to an upscaled Britt Dynamic Drainage Jar. The Z-strength and tensile index of the sheets was then analyzed.

TABLE 1

| Ex. | Sample | Specific Refining Energy (kWh/t) | SR | FT+ Mean length (>0.2 mm) | FT+ Fibril area (>0.2 mm) | FT+ Crill Quota UV/IR | Crill increase 2) | Million fibers (>0.2 mm) per gram | Z-strength (kPa) | Z-strength increase 1) (kPa) | Tensile index (Nm/g) | Tensile index increase 1) (Nm/g) |
|---|---|---|---|---|---|---|---|---|---|---|---|---|
| | | | | | Unfractionated | | | | | | | |
| 1 | SW1 | 466 | 65.9 | 2.023 | 7.4 | 1.31 | 0.31 | 4.8 | 156 | 27 | 28.2 | 6.4 |
| 2 | SW1 | 1032 | 89.7 | 1.64 | 16.2 | 1.58 | 0.58 | 7.7 | 179 | 50 | 29.6 | 7.8 |
| 3 | SW3 | 750 | 91.6 | 1.386 | 22.2 | 1.74 | 0.74 | 8.9 | 150 | 10 | 27.8 | 2.9 |
| 4 | SW2 | 950 | 87.6 | 1.696 | 14.6 | 1.52 | 0.52 | 6.4 | 170 | 50 | 30.1 | 8.6 |
| | | | | | Fine fiber fraction | | | | | | | |
| 5 | SW4 Fine fibre | 1039 | 95.7 | 0.684 | 22.3 | 1.9 | 0.9 | 24.8 | 228 | 99 | 33.2 | 11.4 |
| 6 | SW4 Fine fibre | 1550 | 90.9 | 0.379 | 23.3 | 2.24 | 1.24 | 23.0 | 236 | 107 | 33.7 | 11.9 |
| 7 | SW2 Fine fibre | 1050 | 96.3 | 0.53 | 23.1 | 1.98 | 0.98 | 24.4 | 226 | 106 | 34.2 | 11.6 |
| 8 | SW3 Fine fibre | 1050 | 96.4 | 0.719 | 23.9 | 1.92 | 0.92 | 21.3 | 230 | 90 | 34.8 | 9.9 |
| 9 | SW3 Fine fibre | 1050 | 96.5 | 0.633 | 25.2 | 1.97 | 0.97 | 24.0 | 243 | 103 | 35.2 | 10.3 |

1) compared to 100% CTMP
2) compared to unrefined pulp

The invention claimed is:

1. A refined cellulose fiber composition,
   wherein the refined cellulose fiber composition has a Schopper-Riegler (SR) number in the range of 80-98 as determined by standard ISO 5267-1, and
   wherein the refined cellulose fiber composition has a content of fibers having a length >0.2 mm in a range of 15 to 40 million fibers per gram based on a dry weight; and
   wherein said refined cellulose fibers are refined softwood cellulose fibers.

2. The refined cellulose fiber composition according to claim 1, wherein said refined cellulose fiber composition has a Schopper-Riegler (SR) number in the range of 85-98, as determined by standard ISO 5267-1.

3. The refined cellulose fiber composition according to claim 1, wherein said refined cellulose fiber composition has a content of fibers having a length >0.2 mm in the range of 20 to 30 million fibers per gram based on a dry weight.

4. The refined cellulose fiber composition according to claim 1, wherein said refined cellulose fiber composition has a crill value in a range of 1.8 to 2.5.

5. The refined cellulose fiber composition according to claim 1, wherein said refined cellulose fiber composition has a mean fibril area of fibers having a length >0.2 mm in a range of 17% to 50%.

6. A cellulose pulp for manufacturing paper or paperboard, comprising:
   at least 0.1% by weight of the refined cellulose fiber composition according to claim 1, based on a dry weight.

7. The cellulose pulp for manufacturing paper or paperboard according to claim 6, wherein the cellulose pulp is a chemi-thermomechanical pulp (CTMP).

* * * * *